Figure 1:
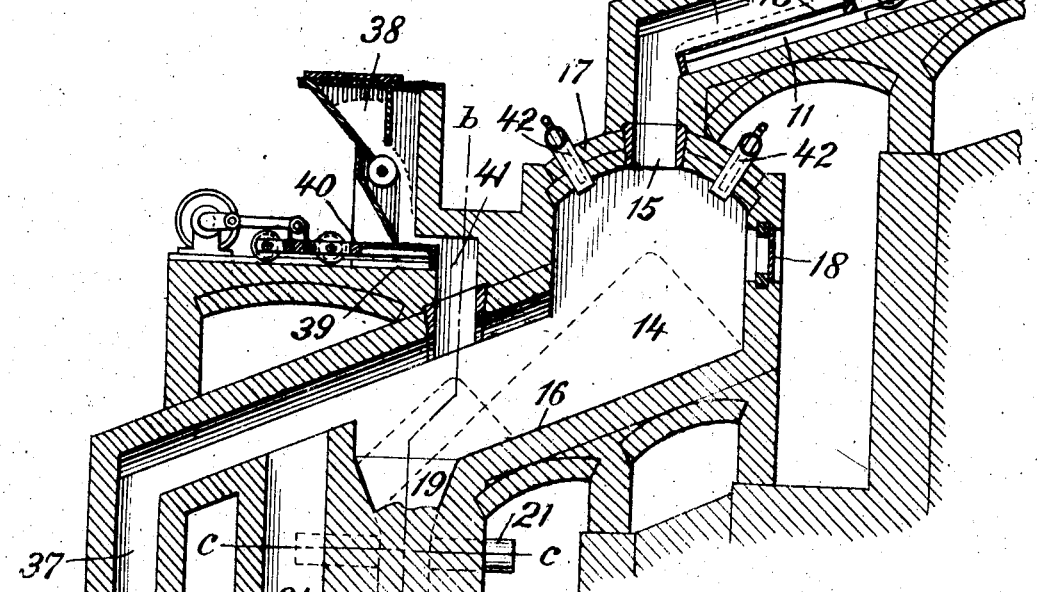

No. 834,656. PATENTED OCT. 30, 1906.
G. H. BENJAMIN.
METALLURGICAL PROCESS FOR THE EXTRACTION OF METALS FROM THEIR ORES AND THE CONVERSION OF IRON INTO STEEL.
APPLICATION FILED DEC. 26, 1902.

2 SHEETS—SHEET 1.

WITNESSES:
J. E. Pearson
Frank O'Connor

INVENTOR
Geo. H. Benjamin

No. 834,656. PATENTED OCT. 30, 1906.
G. H. BENJAMIN.
METALLURGICAL PROCESS FOR THE EXTRACTION OF METALS FROM THEIR ORES AND THE CONVERSION OF IRON INTO STEEL.
APPLICATION FILED DEC. 26, 1902.

2 SHEETS—SHEET 2.

WITNESSES:
J. E. Pearson
Mark O'Connor

INVENTOR
G. H. Benjamin

UNITED STATES PATENT OFFICE.

GEORGE H. BENJAMIN, OF NEW YORK, N. Y.

METALLURGICAL PROCESS FOR THE EXTRACTION OF METALS FROM THEIR ORES AND THE CONVERSION OF IRON INTO STEEL.

No. 834,656.    Specification of Letters Patent.    Patented Oct. 30, 1906.

Application filed December 26, 1902. Serial No. 136,566.

*To all whom it may concern:*

Be it known that I, GEORGE H. BENJAMIN, a citizen of the United States, residing at New York city, county and State of New York, have invented certain new and useful improvements in a new metallurgical process for the extraction of metals from their ores and the conversion of iron into steel, of which the following is a specification.

My invention contemplates the extraction of pig metal from its ore; the conversion of pig metal, like iron, into steel or a steel-like body; the combination of two metals during the process of extraction of one of such metals from its ore—such, for instance, as iron and nickel to form a composite body; the formation of commercially-valuable products by adding to the material under treatment a chemical body or bodies which will combine with the materials accompanying the metal under treatment or with the flux employed—as, for instance, adding carbon to lime; the utilization of the generated gases to effect the primary heating of the ore bodies before such bodies are carried into the zone of highest temperature employed in the metallurgical operations, &c.

The object of my invention is to reduce the cost of the metallurgical operations involved in extracting a metal from its ore or in producing the composite bodies mentioned, and, further, to convert the heretofore commercially-valueless slags into valuable bodies.

My invention, considered broadly, may be used in a large variety of metallurgical operations. For instance, it may be used in the extraction of iron, copper, nickel, and practically all of the metals from their ores.

It may also be used in the production of steel or the combination of steel and other metals—such as nickel-steel, aluminium-steel, and manganese-steel—and all combinations where a high temperature is required to bring the bodies together.

My invention may also be used in the production of glass, calcium carbid, and other combinations of carbon.

I wish it understood that I do not limit myself in any wise to the above-stated uses, as other uses are possible beyond those stated.

To carry my invention into effect, I may make use of the furnace structure which I will now describe, and I wish it understood that I claim such furnace structure as a part of my invention. Other furnace structures, however, may be used for carrying my invention into effect.

Figure 2:
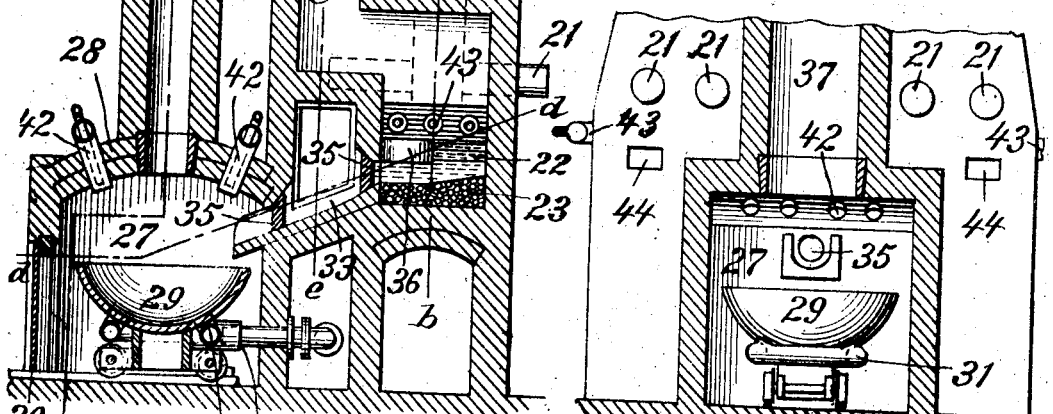
Figure 4:
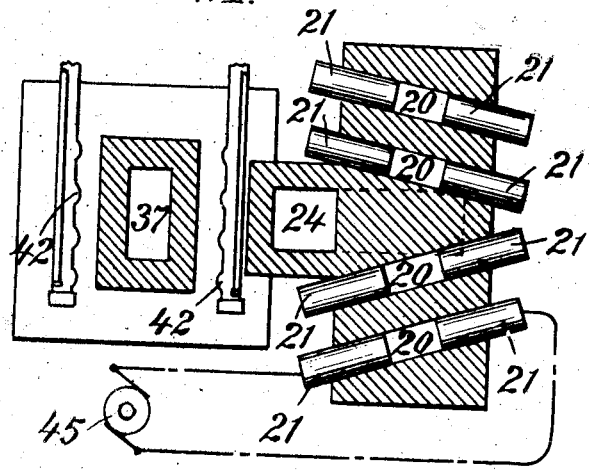
Figure 3:
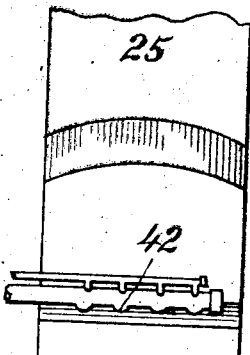
Figure 5:
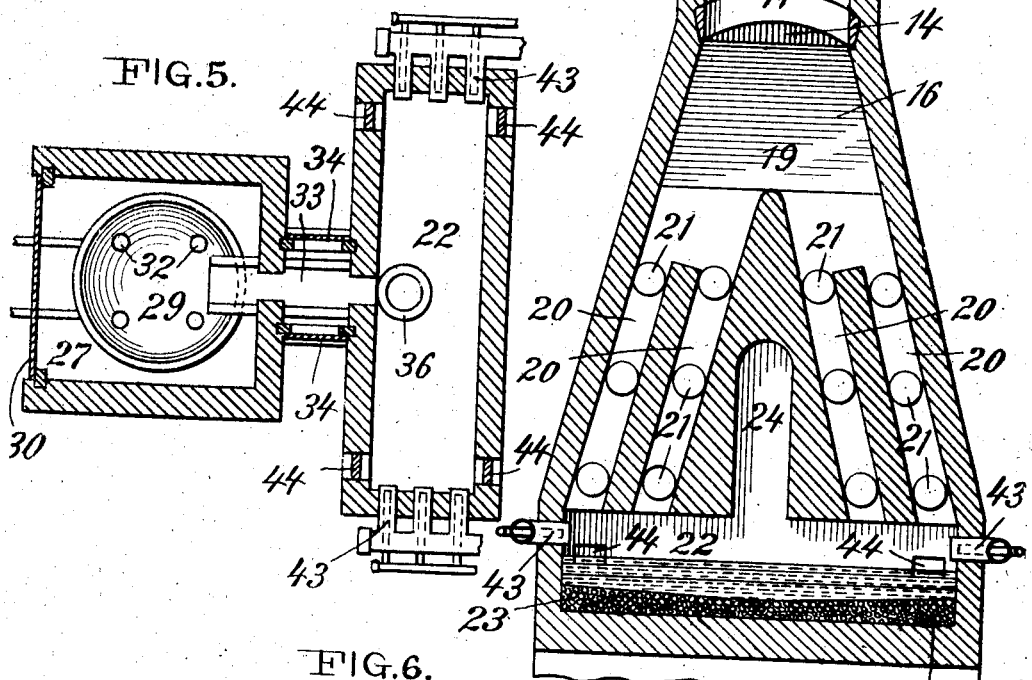
Figure 6:
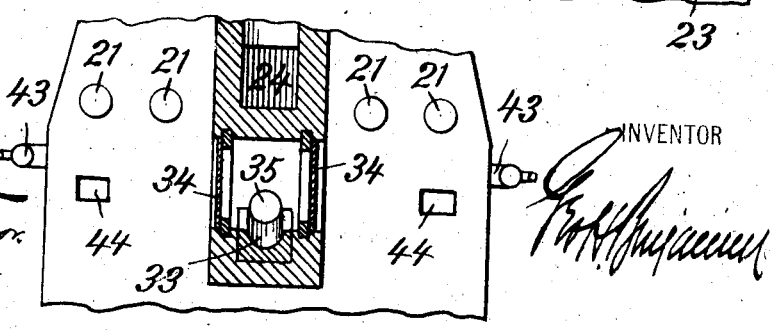

Referring to the drawings, Figure 1 is a vertical section through such furnace structure as I may use. Fig. 2 is a section taken on the line $a\ a$ of Fig. 1. Fig. 3 is a section taken on the line $b\ b$ of Fig. 1. Fig. 4 is a section taken on the line $c\ c$ of Fig. 1. Fig. 5 is a section taken on the line $d\ d$ of Fig. 1. Fig. 6 is a section taken on the line $e\ e$ of Fig. 1.

Similar numerals indicate like parts.

In the drawings, 10 indicates a calcining-chamber, which may be of any suitable construction, preferably, however, having an inclined hearth 11; 12, a feed-hopper communicating with the top of the chamber; 13, a reciprocating rake for moving the material along the hearth of the calcining-chamber. The calcining-chamber 10 is adapted to discharge into a reducing-chamber 14 through an opening 15 in the roof of such chamber. The reducing-chamber is shown as having an inclined hearth 16 and at its upper end an arched roof 17 of considerable vertical height above the hearth. I do not, however, in any wise limit myself to the described construction of the reducing-chamber.

18 indicates a door through which access may be obtained to the interior of the reducing-chamber.

The reducing-chamber 14 discharges into a vertical chamber 19. (Best shown in Fig. 3.) This chamber I denominate the "electric chamber." This chamber gradually increases in width from above downward and is divided into four passage-ways 20, in the sides of which are located oppositely-disposed electrodes 21, as shown in Fig. 4. The electrodes 21 may be formed of carbon rods, packed bodies of carbon, or other granular conducting material and may receive their current from any suitable source of electric energy—for instance, from a dynamo-electric machine 45. Three sets of electrodes are shown in each passage. I do not limit myself in any wise to the character of the electrodes or to the number of electrodes or to their exact disposition in the passage, provided they be so placed that the material treated in passing from the reducing-chamber through the electric chamber is subjected to the physical effects of one or more electric arcs. The passages 20 of the electric chamber discharge into a basin 22, (shown as somewhat wider than the electrical chamber 19,) which basin may have a hearth 23, of any suitable character—that is, I may make the hearth in the ordinary manner, as is usual with reverberatory furnaces, of sand, clay, or other suitable materials, or I may make the hearth of materials which will combine with the metal under treatment—that is, the hearth may be an acid hearth or a basic hearth, as desired.

The basin 22 communicates with the reducing-chamber 14 through a flue 24, which flue serves to carry the radiated heat and gaseous products set free from the material deposited in the basin 22, as also a portion of the light gases generated under the influence of the electric arcs, to the reducing and calcining chambers and thence to the chimney-flue 25. 26 is a damper in the chimney-flue.

Located at a lower plane than the basin 22 is an inclosed chamber 27. This chamber is preferably formed with a high roof 28 and a removable hearth 29. The front of the chamber 27 has a door 30, through which the hearth may be removed. The hearth 29 is shown as mounted on a truck to facilitate its handling. Connected to the hearth 29 is a pipe 31, through which air may be introduced through openings 32 in the bottom of the hearth.

I do not limit myself to the employment of a removable hearth. A fixed hearth may be used, and the hearth may be otherwise modified.

Situated between the basin 22 and the oxidizing-chamber 27 is a trough-like passage 33, (best shown in Fig. 5,) on the forward end of which is a spout adapted to discharge into the cavity of the hearth 29.

It will be observed from Fig. 5 that the opposing faces of the electric chamber 19 and the chamber 27 are separated. The object of this is to allow access through the removable doors 34 to the trough-like passage 33.

35 indicates a plug of clay or other material which may be inserted in the trough-like passage 33 to stop the flow of melted material from the basin 22 into the tank 29.

Floating in the material in the basin 22 is a clay ring 36, which serves to prevent the lighter material, such as the slags, from flowing down the trough-like passage 33 onto the hearth 29.

The top of the chamber 27 is connected, through a flue 37, to the reducing-chamber 14, calcining-chamber 10, and stack 25.

It will be observed from the description so far as given that the heat and gases set free in the chamber 27, the basin 22, and the electric chamber 19 all flow through the reducing-chamber and calcining-chamber on their way to the chimney-stack, and hence serve to effect the preliminary heating and reduction of the material under treatment before it reaches the electric chamber 19.

Located immediately over the electric chamber 19 is a feed-hopper 38, which feeds upon a hearth 39, over which moves a reciprocating rake 40. The hearth 39 is adapted to discharge the material deposited through the hopper 38 through the passage 41 immediately into the electric chamber 19, from whence it moves with the material discharged from the reducing-chamber 14 down the passages 20 and between the electrodes 21. Any suitable means may be employed to aid in heating the reducing-chamber 14, the chamber 27, and basin 22. Preferably I employ hydrocarbon-burners. Such hydrocarbon-burners 42 are shown arranged in the top of the chambers 14 and 27 and adapted to discharge their flames in a downward direction. They may otherwise be arranged. Corresponding burners are arranged on opposite sides of the basin 22 and adapted to discharge their flames horizontally across the chamber.

44 represents doors in the front and back of the basin 22 near its ends, through which any portion of the material under treatment within the basin may be extracted.

My general process and mode of operation of furnace is as follows: Assuming that iron ore is to be converted into pig metal, the ore is introduced through the hopper 12 and passes on to the hearth 11 of the calcining-chamber 10. Here it is subjected to the required calcining temperature, which is comparatively low relative to that of the chambers 14, 19, and 27, and parts with its moisture, which escapes, together with the products of combustion, through the chimney 25. Under the action of the rake 13 the calcined ore is moved forward and drops into the reducing-chamber 14 through the passage 15. Here the ore is subjected to a reducing atmosphere created by the heat and gases arising from the electric chamber 19 and the chambers 22 and 27, and, further, if required, the temperature, as well as the character of the atmosphere within the chamber 14, may be altered or modified by the introduction of gas and air. As the ore is reduced it flows toward the mouth of the electric chamber 19. The ore while in the reducing-chamber occupies approximately the situation represented by the dotted lines, and the ore may, if desired, be fluxed by the addition of lime or other material introduced through the door 18. Preferably, however, the flux is introduced through the hopper 38. I may introduce at this time lime or a mixture of divided lime and carbon. Preferably, however, I first introduce a charge of lime and then a charge of carbon. The carbon used is preferably pure, though coal or coke free from sulfur may be used. As the material or materials mentioned are introduced it or they mingle with the reduced ore flowing from the chamber 14 to the electric chamber 19 and in passing through this chamber are subjected to the physical effects of a series of electric arcs, which physical effects I understand to be, first, those due to the extremely high temperature produced; second, those due to electrolytic action, the generated gases in the arcs forming the electrolyte; third, those due to the mechanical action created by the lines of force passing between the electrodes of the arcs; fourth, those due to the vibratory mechanical action created by the lines of force passing between the electrodes of the arcs when an alternating current is employed; fifth, those due to such chemical actions as can only take place in the presence of an electric arc, and, generally, to all effects comprehended within the broad term "physical effects of an electric arc," many of which at the present time are not understood, the final result being a separation of the metallic iron from the impurities present— such as silicon, phosphorus, and other bodies—and a chemical combination of the carbon with the introduced lime and other bodies separated from the iron ore.

So far as I am at present able to discover there is formed calcium carbid, silicon carbid, as well as a body which appears to be composed of calcium, silicon, and carbon and which acts like calcium carbid in that it will generate a gas when subjected to the action of water, but has the characteristics, so far as hardness is concerned, of silicon carbid.
As the materials pass through the electric chamber the iron, being of the greatest specific gravity, reaches the lowest level and settles in the basin 22, the other fluid materials depositing upon the iron, from whence they may be drawn off through doors 44 in the basin 22. After the metal has been allowed to settle for a short space of time it is drawn off through the trough-like passage 33 and deposited on the hearth 29 in the chamber 27, as the iron in its passage through the electric chamber 19 will absorb a certain amount of the carbon introduced through the hopper 38, and should it be desired to convert the iron into steel it is then subjected to the oxidizing action of an airblast delivered through the pipe 31 until the metal on the hearth 29 shows the required proportion of carbon.

When it is desired to form a combination of iron or steel with some other metal—such, for instance, as nickel—I may introduce such other metal into the reducing-chamber through the door 18 in the form of ore or metal; but preferably it is introduced in a metallic state and in small pieces through the hopper 38 immediately over the electric chamber. The combination is effected as the metals pass between the electrodes in the electric chamber.
Where the furnace is employed in the manufacture of glass, the sand and flux are introduced directly into the reducing-chamber 14 through the door 18 and allowed to gradually work their way down through the electric chamber to the basin 22. The basin in such case is formed of sufficient depth to allow the usual settling and "planing" of the glass-making materials, and while in the basin 22 the material may be drawn from such basin for blowing or casting through the doors 44, or it may be drawn through the trough-like passage 33 into the chamber 27 and on to any suitable hearth 29.

Where the furnace is used as a glass-furnace, the amount of gas and air introduced into the oxidizing-chamber is merely sufficient to maintain the melting heat without producing any oxidizing action.

The removable hearth as described, irrespective of the material under treatment, may be removed for casting or otherwise.

It will be observed from the above description that the features of novelty of my improved process consist, first, in subjecting the ore body to be acted upon to a gradually-increasing temperature and at the same time to the action of the reducing-gases created within the furnace until the zone of highest temperature is reached; second, introducing into the highly-heated and reduced ore body at the zone of highest temperature the metal flux, carbon, or other body or bodies with which the reduced ore body is to be combined; third, subjecting the highly-heated and reduced ore body, accompanied by the metal, carbon, flux, or other body with which it is to be combined, to the physical effect of an electric arc or arcs for a sufficient time to bring about the required chemical combinations of such bodies; fourth, separating by gravity the different bodies produced, and, fifth, subjecting the iron-carbon compounds obtained within the furnace structure to the action of an oxidizing atmosphere for the purpose of removing the whole or a part of the contained carbon.

In carrying out the process above described I have observed that various volatile products are evolved, which in passing through the reducing and calcining chambers are broken up by the heat present and set free hydrogen, which combines with any sulfur present to form sulfurated hydrogen, and therefore permits of the treatment in the furnace described of ores containing a high percentage of sulfur—such, for instance, as iron sulfids—which hitherto have not been successfully treated; further, that where an excess of carbon is used carbonic oxid is generated, which may be drawn off as illuminating-gas or mixed with oxygen and burned in the reducing-chamber and oxidizing-chamber; further, as before stated, I have noticed the presence of other gases.

By the term "combining body" as used in this specification I wish to have it understood that I include any body or bodies, either in the form of a gas, liquid, or solid, which will enter into chemical combination with the metal treated when exposed to the physical effects of an electric arc. I, however, do not include in this description and make no claim for the introduction of air at the temperature of the atmosphere or heated or such gases as are due to decomposition of fuel when such fuel is employed for heating the furnace, as such bodies are in no respect an important factor in carrying out the process specified in this application.

Having therefore described my invention, I claim—

1. The herein-described process which consists in first reducing the ore, then introducing a combining body, then subjecting said bodies while in motion to the effects of an electric arc.

2. The herein-described process which consists in first reducing the ore, then moving such reduced ore and a combining body through a zone of high temperature and while therein, in subjecting said bodies to the effects of an electric arc.

3. The herein-described process which consists in moving a reduced ore body and a combining body separately into a zone of high temperature and while therein, subjecting them to the effects of an electric arc.

4. The herein-described process which consists in first partially reducing the ore in the presence of a flux, then subjecting said reduced and fluxed ore body to the physical effects of an electric arc and simultaneously to the action of a body fed into the reduced ore, and which when subjected to the physical effects of an electric arc will combine with the fluxing material carried by said reduced ore body.

5. The herein-described process which consists in first calcining, then fluxing, then reducing, then subjecting said treated ore while moving to the physical effects of an electric arc and simultaneously to the action of a body fed into the reduced ore, and which when subjected to the physical effects of an electric arc will chemically combine with bodies derived from said ore body.

6. The herein-described process which consists in first partially reducing the ore, then subjecting said reduced ore to the physical effects of an electric arc and simultaneously to the action of a body fed into the reduced ore, and which when subjected to the physical effects of an electric arc will chemically combine with said reduced ore body and finally subjecting the metal derived from the ore body to the action of an oxidizing atmosphere.

7. The herein-described process which consists in first reducing the ore, then introducing a flux, then introducing a carbon body, and simultaneously causing the mixture to be subjected to the physical effects of an electric arc.

8. The herein-described process which consists in first partially reducing the ore, then subjecting said reduced ore to the physical effects of an electric arc and simultaneously to the action of a body which when subjected to the physical effects of an electric arc will chemically combine with the reduced ore body, then separating the metal by gravity from its accompanying bodies and finally subjecting the metal to the action of an oxidizing atmosphere.

9. The herein-described process which consists in subjecting the ore under treatment to a gradually-increasing temperature and to the action of gases generated within the furnace structure whereby the ore is partially reduced, then subjecting the reduced ore to the physical effects of an electric arc and simultaneously therewith to the action of a body or bodies fed into the reduced ore, and which when subjected to the physical effects of an electric arc will chemically combine with or react upon the bodies derived from the reduced ore body.

10. The herein-described process which consists in first reducing, then introducing into the reduced ore, a body or bodies which will chemically combine with it at a definite temperature, and simultaneously subjecting said combined bodies to the physical effects of an electric arc or arcs.

11. The herein-described process which consists in first reducing an ore in an atmosphere containing gases generated by the physical effects of an electric arc upon a reduced ore body and a body of carbon, then subjecting the reduced ore while moving to the physical effects of an electric arc, and simultaneously to the action of a separately-introduced body which when subjected to the physical effects of an electric arc will chemically combine with said reduced ore body.

12. The herein-described process which consists in first reducing the ore, then subjecting such reduced ore to the physical effects of an electric arc, and simultaneously to the action of a body fed into the reduced ore, which when subjected to the physical effects of an electric arc will chemically combine with said reduced ore body, and finally subjecting the metal derived from the ore body to the action of an oxidizing atmosphere and introduced air-blasts.

13. A step in the described process which consists in subjecting the ore body to the combined effects of a gradually-increasing temperature and gases produced by the physical effects of a high-temperature electric arc, acting upon the ore body treated and bodies introduced into the ore-bdy.

14. A step in the process which consists in subjecting an ore body to the action of gases evolved from the decomposition of the ore, bodies introduced into the ore, and the atmosphere while such ore and bodies are moving within the zone of physical influence of an electric arc or arcs.

15. The herein-described process which consists in first subjecting the ore to the action of a reducing atmosphere and chemical bodies then subjecting said reduced ore to the physical effects of an electric arc and simultaneously to the action of a body fed into the reduced ore, and which will combine therewith when subjected to the physical effects of an electric arc.

16. The herein-described process which consists in first partially reducing the ore, then causing the said reduced ore to move by gravity and simultaneously subjecting said moving body of ore to the physical effects of an electric arc and a combining body fed into the reduced ore at the time when it is subjected to the physical effects of an electric arc.

17. The herein-described process which consists in subjecting a partially-reduced ore body while at a high temperature simultaneously to the physical effects of an electric arc and a combining body introduced at such time.

18. The herein-described process which consists in first partially reducing an ore body, moving said ore body while heated into the zone of action of an electric arc and simultaneously subjecting said body to the action of a simultaneously-introduced combining body.

19. The herein-described process which consists in moving a reduced ore body and a combining body into a zone of high temperature, then subjecting said bodies to the effects of successive electric arcs.

20. The herein-described process which consists in first partially reducing the ore, then subjecting the reduced ore to the physical effects of an electric arc and simultaneously to the action of a body fed into the reduced ore, and which will only combine with the ore when both bodies are subjected to the physical effects of an electric arc.

21. The herein-described process which consists in reducing an ore body, causing said ore body in a reduced state to flow into a zone where it may be subjected to the physical action of an electric arc, and continuously feeding into said flowing reduced ore in said zone, a body which will combine with said reduced ore in said zone and under the conditions present in said zone, created by the electric arc.

In testimony whereof I affix my signature in the presence of two witnesses.

GEORGE H. BENJAMIN.

Witnesses:
J. E. PEARSON,
FRANK O'CONNOR.